United States Patent
Shaw et al.

(10) Patent No.: US 10,264,075 B2
(45) Date of Patent: Apr. 16, 2019

(54) METHODS, SYSTEMS, AND DEVICES FOR MULTIPLEXING SERVICE INFORMATION FROM SENSOR DATA

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 187 days.

(21) Appl. No.: 15/443,433

(22) Filed: Feb. 27, 2017

(65) Prior Publication Data
US 2018/0248953 A1 Aug. 30, 2018

(51) Int. Cl.
*H04W 84/18* (2009.01)
*H04L 29/08* (2006.01)
(Continued)

(52) U.S. Cl.
CPC .............. *H04L 67/12* (2013.01); *H04L 67/16* (2013.01); *H04W 4/80* (2018.02); *H04L 61/157* (2013.01); *H04L 61/1588* (2013.01)

(58) Field of Classification Search
CPC .................................................. H04W 84/18
See application file for complete search history.

(56) References Cited

U.S. PATENT DOCUMENTS 4,285,469 A * 8/1981 Hammelmann ........ B63B 59/06
239/750
5,671,253 A * 9/1997 Stewart ................ H04L 1/0046
348/555
(Continued)

FOREIGN PATENT DOCUMENTS

CN 102045896 A 5/2011
CN 105227385 A 1/2016
(Continued)

OTHER PUBLICATIONS

"Cell Site on Light Trucks", 2007, 1 page.
(Continued)

*Primary Examiner* — Ankur Jain
(74) *Attorney, Agent, or Firm* — Guntin & Gust, PLC; Andrew Gust

(57) ABSTRACT

Aspects of the subject disclosure may include, for example, embodiments a service multiplexer identifying a service associated with each of a group of sensors resulting in a group of services. Further embodiments include the service multiplexer creating a service portfolio according to the group of services. Additional embodiments include service multiplexer communicatively coupling to nodes over a 5th Generation (5G) network according to the service portfolio. The 5G network includes a control plane and user plane. Also, embodiments include service multiplexer continuously connecting to the control plane. Further embodiments include receiving data from the sensors. Additional embodiments include service multiplexer determining that the received data is associated with the service portfolio. Also, embodiments include service multiplexer identifying one or more of the nodes according to the service portfolio and sending the received data to the one or more of the nodes over the user plane. Other embodiments are disclosed.

20 Claims, 11 Drawing Sheets

US 10,264,075 B2
Page 2

(51) Int. Cl.
*H04W 4/80* (2018.01)
*H04L 29/12* (2006.01)

(56) References Cited

U.S. PATENT DOCUMENTS

| | | | | |
|---|---|---|---|---|
| 5,970,408 | A * | 10/1999 | Carlsson | H04W 36/36 455/11.1 |
| 6,246,883 | B1 * | 6/2001 | Lee | H04H 20/04 455/507 |
| 6,542,500 | B1 * | 4/2003 | Gerszberg | G06Q 50/188 370/354 |
| 6,795,686 | B2 * | 9/2004 | Master | H04B 7/2609 455/11.1 |
| 6,873,620 | B1 * | 3/2005 | Coveley | H04L 12/66 370/395.31 |
| 7,167,923 | B2 * | 1/2007 | Lo | H04L 12/2834 370/389 |
| 7,206,294 | B2 * | 4/2007 | Garahi | H04W 88/02 370/315 |
| 7,532,640 | B2 * | 5/2009 | Kelly | H04L 69/08 370/352 |
| 7,660,583 | B2 * | 2/2010 | Pekonen | H04W 36/30 370/331 |
| 7,787,414 | B2 * | 8/2010 | Le Faucheur | H04W 76/12 370/328 |
| 8,145,208 | B2 * | 3/2012 | Chari | H01Q 1/283 455/431 |
| 8,234,650 | B1 * | 7/2012 | Eppstein | G06F 9/5072 709/220 |
| 8,385,977 | B2 * | 2/2013 | Fein | H04B 1/38 455/422.1 |
| 8,593,968 | B2 * | 11/2013 | Santiago | H04L 47/10 370/235 |
| 8,621,058 | B2 * | 12/2013 | Eswaran | G06F 9/5072 709/223 |
| 8,676,219 | B2 * | 3/2014 | Pratt, Jr. | G01D 21/00 455/448 |
| 8,868,069 | B2 * | 10/2014 | Bennett | H04W 84/005 455/431 |
| 9,078,284 | B2 * | 7/2015 | Richardson | H04W 88/08 |
| 9,119,016 | B2 * | 8/2015 | Durand | H04M 15/00 |
| 9,185,545 | B2 | 11/2015 | Yeoum et al. | |
| 9,225,587 | B2 * | 12/2015 | Zhang | H04L 41/06 |
| 9,225,652 | B2 * | 12/2015 | Li | H04L 47/18 |
| 9,245,246 | B2 * | 1/2016 | Breitgand | G06Q 10/06 |
| 9,298,515 | B2 * | 3/2016 | McMurry | H04L 67/1031 |
| 9,301,333 | B2 * | 3/2016 | Chin | H04W 36/0022 |
| 9,305,301 | B2 * | 4/2016 | Paul | G06Q 30/02 |
| 9,306,909 | B2 * | 4/2016 | Koponen | H04L 41/0823 |
| 9,311,108 | B2 * | 4/2016 | Cummings | H04W 8/22 |
| 9,330,156 | B2 * | 5/2016 | Satapathy | G06F 17/30575 |
| 9,369,390 | B2 * | 6/2016 | Bantukul | H04L 47/127 |
| 9,391,897 | B2 * | 7/2016 | Sparks | H04L 47/11 |
| 9,392,471 | B1 * | 7/2016 | Thomas | H04W 36/0083 |
| 9,401,962 | B2 * | 7/2016 | Parker | H04L 45/06 |
| 9,407,542 | B2 * | 8/2016 | Vasseur | H04W 40/24 |
| 9,436,443 | B2 * | 9/2016 | Chiosi | G06F 8/35 |
| 9,445,341 | B2 * | 9/2016 | Spinelli | H04W 92/02 |
| 9,450,817 | B1 * | 9/2016 | Bahadur | H04L 45/64 |
| 9,450,823 | B2 * | 9/2016 | Arora | H04L 41/082 |
| 9,461,729 | B2 * | 10/2016 | Djukic | H04B 7/15507 |
| 9,497,572 | B2 * | 11/2016 | Britt | G06F 8/36 |
| 9,503,969 | B1 * | 11/2016 | Zakaria | H04W 48/16 |
| 9,544,120 | B2 * | 1/2017 | Scholten | H04L 5/0053 |
| 9,559,980 | B2 * | 1/2017 | Li | H04L 47/782 |
| 9,565,074 | B2 * | 2/2017 | Lehane | H04L 41/5054 |
| 9,602,422 | B2 * | 3/2017 | Yip | H04L 47/56 |
| 9,961,016 | B2 * | 5/2018 | Ringland | H04L 63/0823 |
| 10,039,006 | B2 | 7/2018 | Shaw et al. | |
| 2003/0145106 | A1 * | 7/2003 | Brown | H04L 29/06 709/238 |
| 2003/0152034 | A1 * | 8/2003 | Zhang | H04L 29/12509 370/252 |
| 2004/0071086 | A1 * | 4/2004 | Haumont | H04L 12/5602 370/230 |
| 2004/0103308 | A1 * | 5/2004 | Paller | H04L 63/10 726/12 |
| 2007/0022191 | A1 * | 1/2007 | Miao | H04L 41/0803 709/223 |
| 2007/0140269 | A1 * | 6/2007 | Donnelli | E02F 9/20 370/401 |
| 2007/0259661 | A1 * | 11/2007 | Hurtta | H04L 65/1069 455/432.1 |
| 2007/0294668 | A1 * | 12/2007 | Mohindra | G06F 8/36 717/120 |
| 2008/0285492 | A1 * | 11/2008 | Vesterinen | H04W 76/12 370/310 |
| 2009/0296827 | A1 * | 12/2009 | Karaoguz | H04N 21/23439 375/240.26 |
| 2010/0017506 | A1 * | 1/2010 | Fadell | H04M 15/00 709/224 |
| 2010/0234071 | A1 * | 9/2010 | Shabtay | H04B 7/0408 455/562.1 |
| 2011/0182227 | A1 * | 7/2011 | Rune | H04W 8/082 370/312 |
| 2011/0238840 | A1 * | 9/2011 | Shi | H04L 41/5006 709/226 |
| 2011/0282931 | A1 * | 11/2011 | Chen | H04L 29/1216 709/203 |
| 2011/0292896 | A1 * | 12/2011 | Yeoum | H04W 8/082 370/329 |
| 2012/0140749 | A1 * | 6/2012 | Caldwell | H04W 48/18 370/338 |
| 2012/0184266 | A1 * | 7/2012 | Faccin | H04W 48/08 455/426.1 |
| 2012/0236716 | A1 * | 9/2012 | Anbazhagan | H04L 41/5022 370/235 |
| 2012/0303828 | A1 * | 11/2012 | Young | H04L 67/20 709/229 |
| 2013/0010756 | A1 * | 1/2013 | Liang | H04W 36/18 370/331 |
| 2013/0072199 | A1 * | 3/2013 | Miyagawa | H04W 36/10 455/438 |
| 2013/0337872 | A1 * | 12/2013 | Fertl | H04W 88/08 455/562.1 |
| 2014/0023044 | A1 * | 1/2014 | Sjolinder | H04L 67/1095 370/331 |
| 2014/0059194 | A1 * | 2/2014 | Robb | G06F 9/5072 709/223 |
| 2014/0070892 | A1 * | 3/2014 | Matsuoka | H03L 1/022 331/34 |
| 2014/0254382 | A1 * | 9/2014 | Randriamasy | H04W 40/36 370/235 |
| 2014/0259012 | A1 * | 9/2014 | Nandlall | H04W 4/003 718/1 |
| 2014/0269435 | A1 * | 9/2014 | McConnell | H04L 12/1432 370/259 |
| 2014/0307556 | A1 * | 10/2014 | Zhang | H04L 45/302 370/236 |
| 2014/0349611 | A1 * | 11/2014 | Kant | H04W 8/18 455/411 |
| 2014/0376454 | A1 * | 12/2014 | Boudreau | H04W 4/70 370/329 |
| 2015/0109967 | A1 * | 4/2015 | Hogan | H04M 15/66 370/259 |
| 2015/0113100 | A1 | 4/2015 | Tweedale et al. | |
| 2015/0139238 | A1 * | 5/2015 | Pourzandi | H04L 45/42 370/392 |
| 2015/0172115 | A1 * | 6/2015 | Nguyen | H04L 67/10 709/226 |
| 2015/0257012 | A1 * | 9/2015 | Zhang | H04W 16/14 455/454 |
| 2015/0257038 | A1 * | 9/2015 | Scherzer | H04L 12/1478 370/329 |
| 2015/0295833 | A1 * | 10/2015 | Mizukoshi | H04L 47/125 370/235 |
| 2015/0319078 | A1 * | 11/2015 | Lee | H04L 12/6418 370/392 |

(56) References Cited

U.S. PATENT DOCUMENTS

| | | | |
|---|---|---|---|
| 2015/0350102 A1* | 12/2015 | Leon-Garcia | H04L 41/12 709/226 |
| 2015/0378753 A1* | 12/2015 | Phillips | G06F 9/455 718/1 |
| 2015/0382278 A1* | 12/2015 | Fallon | H04W 40/04 370/338 |
| 2016/0014787 A1* | 1/2016 | Zhang | H04W 4/70 370/329 |
| 2016/0021588 A1* | 1/2016 | Kamdar | H04W 28/08 370/331 |
| 2016/0021684 A1* | 1/2016 | Lewis | H04W 76/10 370/329 |
| 2016/0044136 A1* | 2/2016 | Schiff | H04L 67/10 709/221 |
| 2016/0073278 A1* | 3/2016 | Roessler | H04L 49/70 370/252 |
| 2016/0080484 A1* | 3/2016 | Earl | H04L 67/1031 709/226 |
| 2016/0088092 A1* | 3/2016 | Cardona-Gonzalez | H04L 67/141 709/227 |
| 2016/0094668 A1* | 3/2016 | Chang | H04L 67/16 709/223 |
| 2016/0095019 A1* | 3/2016 | Cui | H04W 36/0011 370/331 |
| 2016/0095042 A1* | 3/2016 | Wadhwa | H04W 40/02 370/328 |
| 2016/0105821 A1* | 4/2016 | Senarath | H04W 4/00 370/329 |
| 2016/0105893 A1* | 4/2016 | Senarath | H04W 4/021 370/329 |
| 2016/0112335 A1* | 4/2016 | Bouanen | H04L 47/2441 370/236 |
| 2016/0112903 A1* | 4/2016 | Kaushik | H04W 28/0205 370/235 |
| 2016/0113018 A1* | 4/2016 | Li | H04W 72/0493 709/226 |
| 2016/0127230 A1* | 5/2016 | Cui | H04W 40/02 370/389 |
| 2016/0127239 A1* | 5/2016 | Kahn | H04L 41/0813 370/229 |
| 2016/0142282 A1* | 5/2016 | Guo | H04L 12/6418 370/392 |
| 2016/0142427 A1* | 5/2016 | de Los Reyes | H04L 63/20 726/23 |
| 2016/0149815 A1* | 5/2016 | Cotter | H04L 43/0876 370/235 |
| 2016/0150421 A1* | 5/2016 | Li | H04W 24/02 370/235 |
| 2016/0150448 A1* | 5/2016 | Perras | H04W 36/12 455/450 |
| 2016/0156513 A1* | 6/2016 | Zhang | H04W 4/70 709/220 |
| 2016/0164787 A1* | 6/2016 | Roach | H04L 47/125 370/235 |
| 2016/0174191 A1* | 6/2016 | Singh | H04W 68/12 370/329 |
| 2016/0183156 A1 | 6/2016 | Chin et al. | |
| 2016/0212017 A1* | 7/2016 | Li | H04L 41/20 |
| 2016/0218948 A1* | 7/2016 | Djukic | H04L 43/0876 |
| 2016/0218971 A1* | 7/2016 | Basunov | H04L 45/70 |
| 2016/0219076 A1* | 7/2016 | Paczkowski | G06F 9/45558 |
| 2016/0248860 A1* | 8/2016 | Dunbar | H04L 67/16 |
| 2016/0249353 A1* | 8/2016 | Nakata | H04W 28/16 |
| 2016/0262044 A1* | 9/2016 | Calin | H04W 28/0268 |
| 2016/0286043 A1* | 9/2016 | John | H04W 88/00 |
| 2016/0294732 A1* | 10/2016 | Chou | H04L 49/25 |
| 2016/0294734 A1* | 10/2016 | Jang | H04L 41/0654 |
| 2016/0295614 A1* | 10/2016 | Lee | H04W 48/08 |
| 2016/0301566 A1* | 10/2016 | Ramasubramani | H04L 65/1069 |
| 2016/0352645 A1* | 12/2016 | Senarath | H04L 47/41 |
| 2016/0352924 A1* | 12/2016 | Senarath | H04M 15/8016 |
| 2016/0353268 A1* | 12/2016 | Senarath | H04W 4/24 |
| 2016/0353422 A1* | 12/2016 | Vrzic | H04W 16/02 |
| 2016/0353465 A1* | 12/2016 | Vrzic | H04W 12/06 |
| 2016/0359682 A1* | 12/2016 | Senarath | H04W 16/14 |
| 2016/0373372 A1* | 12/2016 | Gillon | H04L 47/74 |
| 2016/0381146 A1* | 12/2016 | Zhang | H04L 67/141 709/228 |
| 2016/0381528 A1* | 12/2016 | Lee | H04W 4/90 455/404.1 |
| 2016/0381662 A1* | 12/2016 | Wang | H04W 12/00 370/329 |
| 2017/0005390 A1* | 1/2017 | Zakaria | H01Q 1/22 |
| 2017/0026887 A1* | 1/2017 | Sirotkin | H04W 28/08 |
| 2017/0034761 A1* | 2/2017 | Narayanan | H04L 12/1407 |
| 2017/0054595 A1* | 2/2017 | Zhang | H04L 41/0896 |
| 2017/0064591 A1* | 3/2017 | Padfield | H04W 36/0088 |
| 2017/0064666 A1* | 3/2017 | Zhang | H04W 64/00 |
| 2017/0070892 A1* | 3/2017 | Song | H04W 16/18 |
| 2017/0078183 A1* | 3/2017 | Civanlar | H04L 45/02 |
| 2017/0079059 A1* | 3/2017 | Li | H04W 16/02 |
| 2017/0085493 A1* | 3/2017 | Senarath | H04L 47/522 |
| 2017/0086049 A1* | 3/2017 | Vrzic | H04L 67/327 |
| 2017/0086118 A1* | 3/2017 | Vrzic | H04W 36/26 |
| 2017/0104609 A1* | 4/2017 | McNamee | H04L 12/4641 |
| 2017/0104688 A1* | 4/2017 | Mirahsan | H04L 12/4641 |
| 2017/0105144 A1* | 4/2017 | Strand | H04W 16/18 |
| 2017/0150399 A1* | 5/2017 | Kedalagudde | H04W 28/08 |
| 2017/0164419 A1* | 6/2017 | Kim | H04L 5/00 |
| 2017/0244598 A1* | 8/2017 | Crouse | H04L 41/0806 |
| 2017/0257276 A1* | 9/2017 | Chou | H04L 41/0823 |
| 2017/0272978 A1* | 9/2017 | Giloh | H04L 12/4633 |
| 2017/0279672 A1* | 9/2017 | Krishnan | H04L 41/0803 |
| 2017/0300350 A1* | 10/2017 | Ferris | G06F 9/5072 |
| 2017/0302369 A1* | 10/2017 | Kwoczek | H04W 16/26 |
| 2017/0303189 A1* | 10/2017 | Hampel | H04W 48/20 |
| 2017/0308407 A1* | 10/2017 | Vaishnavi | G06F 9/5083 |
| 2017/0329639 A1* | 11/2017 | Morper | G06F 9/5072 |
| 2017/0339567 A1 | 11/2017 | Li et al. | |
| 2018/0098246 A1* | 4/2018 | Hoffmann | H04W 24/02 |
| 2018/0123932 A1* | 5/2018 | Shaw | H04L 47/24 |
| 2018/0124254 A1* | 5/2018 | Shaw | H04M 15/852 |
| 2018/0124592 A1* | 5/2018 | Ye | H04L 12/66 |
| 2018/0139129 A1* | 5/2018 | Dowlatkhah | H04L 12/66 |
| 2018/0160311 A1* | 6/2018 | Shaw | H04L 61/2007 |
| 2018/0254920 A1* | 9/2018 | Shaw | H04L 12/4641 |

FOREIGN PATENT DOCUMENTS

| | | |
|---|---|---|
| CN | 105516312 A | 4/2016 |
| CN | 105979542 A | 9/2016 |
| CN | 106257944 A | 12/2016 |
| JP | 5656803 B2 | 1/2015 |
| KR | 1473783 | 12/2014 |
| WO | 2000067449 | 11/2000 |
| WO | 2014071084 A2 | 5/2014 |
| WO | 2015198087 A1 | 12/2015 |
| WO | 2016051237 | 4/2016 |
| WO | 2016126238 A1 | 8/2016 |
| WO | 2016162467 A1 | 10/2016 |
| WO | 2016192639 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017058067 | 4/2017 |

OTHER PUBLICATIONS

"Network Slicing", ericsson.com, Apr. 12, 2017,.
"Network Slicing for 5G Networks and Services", 5G Americas™, 5gamericas.org, Nov. 2016.
"The Edge of the Cloud 5G Technology Blog", edgeofcloud.blogspot.com, TechBlogger, pen, Apr. 8, 2017.
Biral, Andrea et al., "The Challenges of M2M Massive Access in Wireless Cellular Networks", Department of Information Engineering of the University of Padova, Mar. 27, 2015, 1-19.

(56) References Cited

OTHER PUBLICATIONS

Bor-Yaliniz, et al., "The new frontier in RAN heterogeneity: Multi-tier drone-cells", 2016, 9 pages.

Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), IEEE. IEEE, 2014., 2014, 1-8.

Deak, Gabriel et al., "IoT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.

Dhekne, et al., "Extending Cell Tower Coverage through Drones", 2017, 6 pages.

Ghavimi, Fayezeh et al., "M2M Communications in 3GPP LTE/LTE-A Networks: Architectures, Service Requirements, Challenges, and Applications", IEEE Communication Surveys & Tutorials, vol. 17, No. 2, Second Quarter 2015, May 9, 2015, 525-549.

Gramaglia, Marco et al., "Flexible connectivity and QoE/QoS management for 5G Networks: The 5G Norma view", Communications Workshops (ICC), 2016 IEEE International Conference on. IEEE, 2016.

Le, Long B., "Enabling 5G Mobile Wireless Technologies", EURASIP Journal on Wireless Communications and Networking 2015.1 (2015): 218., 2015, 1-14.

McCullough, Don, "Why 5G Network Slices?", ericsson.com, Feb. 17, 2015.

Nikaein, Navid et al., "Network store: Exploring slicing in future 5g networks", Proceedings of the 10th International Workshop on Mobility in the Evolving Internet Architecture, ACM, 2015.

Novo, Oscar et al., "Capillary Networks—Bridging the Cellular and IoT Worlds", Internet of Things (WF-IoT), 2015 IEEE 2nd World Forum on. IEEE, 2015., 2015, 1-8.

Open Networking Foundation, "TR-526 Applying SDN Architecture to 5G Slicing", Issue 1, Apr. 2016, 1-19.

Podleski, Lukasz et al., "Multi-domain Software Defined Network: exploring possibilities in", TNC, 2014.

Sayadi, Bessem et al., "SDN for 5G Mobile Networks: NORMA Perspective", International Conference on Cognitive Radio Oriented Wireless Networks, Springer International Publishing, 2016.

\* cited by examiner

400

US 10,264,075 B2

METHODS, SYSTEMS, AND DEVICES FOR MULTIPLEXING SERVICE INFORMATION FROM SENSOR DATA

FIELD OF THE DISCLOSURE

The subject disclosure relates to methods, systems, and devices for multiplexing service information from sensor data.

BACKGROUND

Customer premises including residential homes and commercial building can have a network of various sensors or Internet of Things (IoT) devices to measure, record, configure, or provide services or applications for the occupants with regard to different premises devices and/or appliances. Further, the network of IoT devices can be coupled to a communication network that may be a heterogeneous network comprising cellular, WiFi, and/or Bluetooth networks such as a 5G network. Network service nodes that provide or gather data from the IoT devices via the 5G network to provide services and applications to occupants of the customer premises.

BRIEF DESCRIPTION OF THE DRAWINGS

Reference will now be made to the accompanying drawings, which are not necessarily drawn to scale, and wherein.

DETAILED DESCRIPTION

Figure 1:
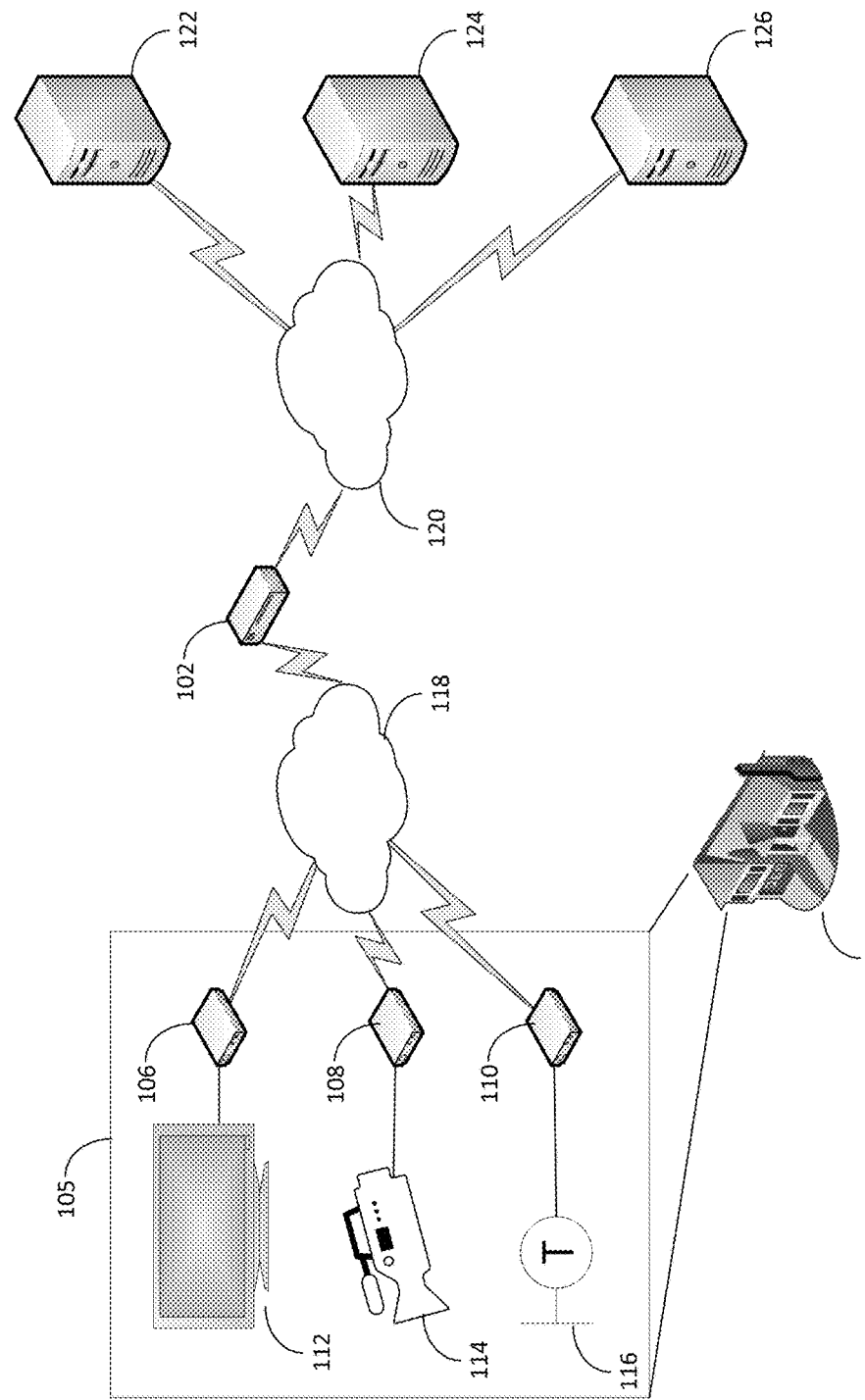
FIGS. 1-6 depict illustrative embodiments of systems for multiplexing service information from sensor data.

The subject disclosure describes, among other things, illustrative embodiments for identifying at least one service associated with a plurality of sensors (a sensor and an IoT device may be used to describe devices that provide similar functions) resulting in a group of services. Each of plurality of sensors is associated with at least one of the group of services. Further embodiments include creating a service portfolio according to the group of services. Additional embodiments include communicatively coupling to multiple network services nodes over a 5th Generation (5G) wireless network according to the service portfolio. The 5G wireless network includes equipment operating in at least a control plane and user plane. Also, embodiments include continuously connecting to the control plane of the 5G network. Further embodiments include receiving data from the multiple sensors resulting in received data. Additional embodiments include determining that the received data is associated with the service portfolio. Also, embodiments include identifying a target network services node from the multiple network services nodes according to the service portfolio. Further embodiments include sending the received data to the target network services node over the user plane of the 5G wireless network. Other embodiments are described in the subject disclosure.

One or more aspects of the subject disclosure include a device. The device comprises a processing system including a processor and a memory that stores executable instructions that, when executed by the processing system, facilitate performance of operations. Operations include identifying at least one service associated with a plurality of sensors resulting in a group of services. Each of plurality of sensors is associated with at least one of the group of services. Further operations include creating a service portfolio according to the group of services. Additional operations include communicatively coupling to multiple network services nodes over a 5th Generation (5G) wireless network according to the service portfolio. The 5G wireless network includes equipment operating in at least one of a control plane and user plane. Also, operations include continuously connecting to the control plane of the 5G network. Further operations include receiving data from the plurality of sensors resulting in received data. Additional operations include determining that the received data is associated with the service portfolio. Also, operations include identifying a target network services node from the multiple network services nodes according to the service portfolio. Operations include sending the received data to the target network services node over the user plane of the 5G wireless network.

One or more aspects of the subject disclosure include a machine-readable storage medium, comprising executable instructions that, when executed by a processing system including a processor, facilitate performance of operations. Operations include identifying at least one service associated with a plurality of sensors resulting in a group of services. Each of plurality of sensors is associated with at least one of the group of services. Further operations can include creating a tailored application according to the group of services. Additional operations can include communicatively coupling to multiple network services nodes over a 5th Generation (5G) wireless network according to the tailored application. The 5G wireless network includes equipment operating in at least one of a control plane and user plane. Also, operations can include continuously connecting to the control plane of the 5G network. Further operations include receiving data from the multiple sensors resulting in received data and determining that the received data is associated with the tailored application. Additional operations can include identifying a target network services node from the multiple network services nodes according to the tailored application. Also, operations can include sending the received data to a target network services node over the user plane of the 5G wireless network.

One or more aspects of the subject disclosure include a method. The method includes identifying, by a processing system including a processor, at least one service associated with a plurality of sensors resulting in a group of services. Each of plurality of sensors is associated with at least one of the group of services. Further, the method includes creating, by the processing system, a user configurable definable module according to the group of services. In addition, the method communicatively coupling, by the processing system, to multiple network services nodes over a 5th Generation (5G) wireless network according to the user configurable definable module. The 5G wireless network includes equipment operating in at least one of a control plane and user plane. In addition, the method includes continuously connecting, by the processing system, to the control plane of the 5G network. Also, the method includes receiving, by the processing system, data from the multiple sensors resulting in received data. Further, the method includes determining, by the processing system, that the received data is associated with the user configurable definable module. In addition, the method includes identifying, by the processing system, a target network services node from the multiple network services nodes according to the user configurable definable module. Also sending, by the processing system, the received data to the target network services node over the user plane of the 5G wireless network.

FIGS. 1-6 depict illustrative embodiments of systems for multiplexing service information from sensor data. Referring to FIG. 1, one or embodiments of a system 100 include a service multiplexer 102 coupled to and in communication with several network services nodes 122, 124, 126 over a communication network 120. In some embodiments, the communication network 120 can be a 5G communication network. In further embodiments, the communication network can be also be a communication network that includes wireless networks such as cellular networks, WiFi networks, and Bluetooth networks. In other embodiments, the service multiplexer can be coupled to and in communication with sensors 106, 108, 110 over a communication network 118. Further, communication network 118 can be referred to a sensor/IoT network. Sensors 106, 108, 110 can be coupled to an appliance or placed in a room to detect environmental conditions, or measure other metrics for a customer premises 104. The customer premises 104 can be a residential home or a commercial building. Further, in some embodiments, service multiplexer 102 and/or communication network 118 can be located within the customer premises 104. In other embodiments, service multiplexer 102 and portions of communication network 118 can be located outside customer premises. In addition, sensors 106, 108, 110 can be referred to as Internet of Thing (IoT) devices. Sensors and/or IoT devices perform similar functions such as communicating with one or more network services nodes 122, 124, 126 that include receiving instructions and commands from the networks services node to control a premises device of appliance and exchanging content or data as well as receiving instructions or content from other sensors/IoT devices via the service multiplexer 102.

In one or more embodiments, the sensor 106 can be communicatively coupled to a media device (e.g. television), the sensor 108 can be communicatively coupled to a video surveillance camera 114, and the sensor 110 can be communicatively coupled to a thermostat 116. In one or more embodiments, the service multiplexer is communicatively coupled to network services nodes 122, 124, 126 over a communication network 120. In some embodiments, the network services node 122 can be a media server operated by a media service provider. In other embodiments, the network services node 124 can be a premises security server operated by a premises security service provider. In further embodiments, the network services node 124 can be a utility server operated by a power utility company.

In one or more embodiments, the communication network 118 may be an Internet Protocol (IP) network such that all devices on the communication network 118 each have an IP address. In other embodiments, the communication network 118 may be a non-IP communication network an each device on the communication network has another type of unique identifier. In some embodiments, the service multiplexer 102 may exchange information between the network services node 122, 124, 126 and the sensors/IoT devices 106, 108, 110 to test the operation of the sensor/IoT device. In further embodiments, the sensor/IoT device 106, 108, 110 may have a Subscriber Identity Module (SIM) that can used in testing and controlling the operations of the sensor/IoT device 106, 108, 110.

In one or more embodiments, a user associated with the customer premises 104 may request media content to be presented on the media device 112. Thus, the service multiplexer 102 may receive the media content from the media server 122 and provide the media content to the media device 112 for presentation. In some embodiments, the video surveillance camera 114 may capture video of portions of the customer premises 104 environment and provide the service multiplexer 102 with the captured video. Further, the service multiplexer 102 may provide the captured video to the premises security server 124 for further analysis (e.g. image processing to determine whether a possible intruder on the customer premises). In other embodiments, the user may provide instructions from a mobile phone to the utility server 126 to decrease the heat in the customer premises 104 while the user is traveling away from the customer premises 104. The utility server 126 may then provide a command to decrease the heat of the customer premises 104 to the service multiplexer 102. Further, the service multiplexer 102 can provide the command to the thermostat 116.

In one or more embodiments, the user may create a service portfolio for customer premises 104 security using the media device 112, video surveillance camera 114, and thermostat 116 as well the associated sensors/IoT devices 106, 108, 110. Further, the user can create tailored application using devices 112, 114, 116 and sensors/IoT devices 106, 108, 110 within a service portfolio or across different service portfolios. Example service portfolios can be a media device 112 such as a television as well as a tablet computer and smartphone can be part of a media service portfolio with the customer premises. Further, the user can configure the service portfolio to include devices such as the media device 112, tablet computer, and smartphone. Thus, when media content is requested from the media server 122 by the user from a control device (e.g. smartphone, computer, remote control, home assistant (e.g. Google™ Home, Amazon™ Echo, etc.), etc.), the service multiplexer 102 retrieves the media content from the media server 122 and provides the media content to the media device 112, tablet computer, and/or smartphone (e.g. based on the presence information).

Another example service portfolio can include the video surveillance camera 114 as well as door contact sensor and window breaking sensors located throughout the customer premises 104. Captured video is provided to the premises security server 124 through the service multiplexer 102. Further, alarms associated with unauthorized access to the customer premises 104 detected by the door contact sensors and window breaking sensors are provided to the premises security server 124 through the service multiplexer 102. Based on these alarms, the premises security server 125 can initiate dispatch of emergency personnel to the customer premises 104 as well as notify the user via alerts to user smartphone.

A further example service portfolio can include the thermostat 116 as well as a power meter associated with the customer premises 104. Recorded data from the thermostat as well as the power meter can be provided to the utility server 126 through the service multiplexer 102. Further, the utility server 126 can archive such data for analysis to determine power efficiency of the customer premises 104.

In one or more embodiments, the user can configure a service portfolio for specific purposes. Further, the user can create a tailored application within the service portfolio (or across service portfolios) using some or all of the devices that provide information for the service. For example, the media device 112 and sensor/IoT device 106 as well as the video surveillance camera 114 and sensor/IoT device 108 may be part of a tailored application configured by the user. That is, the user may configure using a control device (e.g. smartphone, computer, etc.) to generate the tailored application of viewing video captured by the video surveillance camera 114 on the media device. In some embodiments, the service multiplexer 102 receives the configuration information of the tailored application. In some embodiments, the service multiplexer 102 automatically or in response to further user input can request captured video from the premises security server 124 and provide the captured video to the media device 112 for presentation. In other embodiments, the service multiplexer 102 automatically or in response to further user input can retrieve captured video stored in the video surveillance camera 114 (or other premises storage device) and provide the captured video to the media device 112 for presentation.

As another example, the user can create a tailored application that includes the video surveillance camera 114 and sensor/IoT device 108 as well as thermostat 116 and sensor/IoT device 110. The video surveillance camera 114 can provide the premises security server 124 with captured video through the service multiplexer 102. The premises security server 124 can identify an intruder using image processing techniques on the captured video. Further, the premises security server 124 can use information from the thermostat 116 to determine whether the user is within the customer premises 104 when the intruder was detected. That is, the user may have configured the tailored application a priori that if the thermostat is below 66 degrees then the user is not within the customer premises 104. However, if the thermostat is 66 degree and above then the user may be within the customer premises 104. Thus, when the premises security server 124 detects a possible intruder, the premises security server 124 may query the service multiplexer 102 for the current temperature level of the thermostat 116. The service multiplexer 102 can retrieve from the thermostat 116 the current temperature level and forward such information to the premises security server 124. In response to receiving the current temperature level of the thermostat 116 and determining whether it is above or below the 66 degree threshold, the premises security server 124 sends a message to emergency personnel and/or to the user. If the current temperature level is above 66 degrees, then the user is likely to be within the customer premises 104 and the premises security server 124 may call a landline telephone within the customer premises to notify the user. However, if the current temperature level is below 66 degrees then the user is not likely within the customer premises 104 and the premises security server 124 may call the user's smartphone to notify the user of the possible intruder.

In one or more embodiments, the user may dynamically group some of the sensors/IoT devices 106, 110, 114 into a service portfolio or tailored application. Further, the user may create user configurable definable module that can integrate with a service. For example, the media device 112 and thermostat 116 can be part of a user configurable definable module of a tailored application as part of a customer premises security service as described herein.

In one or more embodiments, the service multiplexer 102 is communicatively coupled to network services nodes 122, 124, 126 over communication network 120. In some embodiments, the communication network 120 is a 5G network that can be a heterogeneous communication network comprising wireless, cellular, WiFi, and/or Bluetooth networks that has a control plane and a user plane. The service multiplexer 102 can be configured to have an "always-active-session" on the control plane of communication network 120 that communicates with network services nodes 122, 124, 126. Instead of using network resources within communication network 120 in every instance there is communication between the service multiplexer 102 and one of the network services nodes 122, 124, 126, the network resources are used only once to provide communication between the service multiplexer 102 and one of the network services nodes 122, 124, 126 thereby increasing the efficiency in using network resources. In other embodiments, the service multiplexer 102 initiates communication on the user plane of the communication network 120 between itself and one of the network services nodes 122, 124, 126 when the service multiplexer 102 provides data from one of the sensors 106, 110, 114 and/or devices 112, 114, 116. In further embodiments, one of the network services nodes 122, 124, 126 initiates communication on the user plane of the communication network 120 between itself and the service multiplexer 102 when the one of the network services node 122, 124, 126 provides data to one of the sensors/IoT devices 106, 110, 114 and/or devices 112, 114, 116.

As described herein, communication, including exchange of data and control information, between devices 112, 114, 116 and service multiplexer 102 can be done via the sensors/IoT devices 106, 108, 110 communicative coupled to the devices 112, 114, 116.

Figure 2:
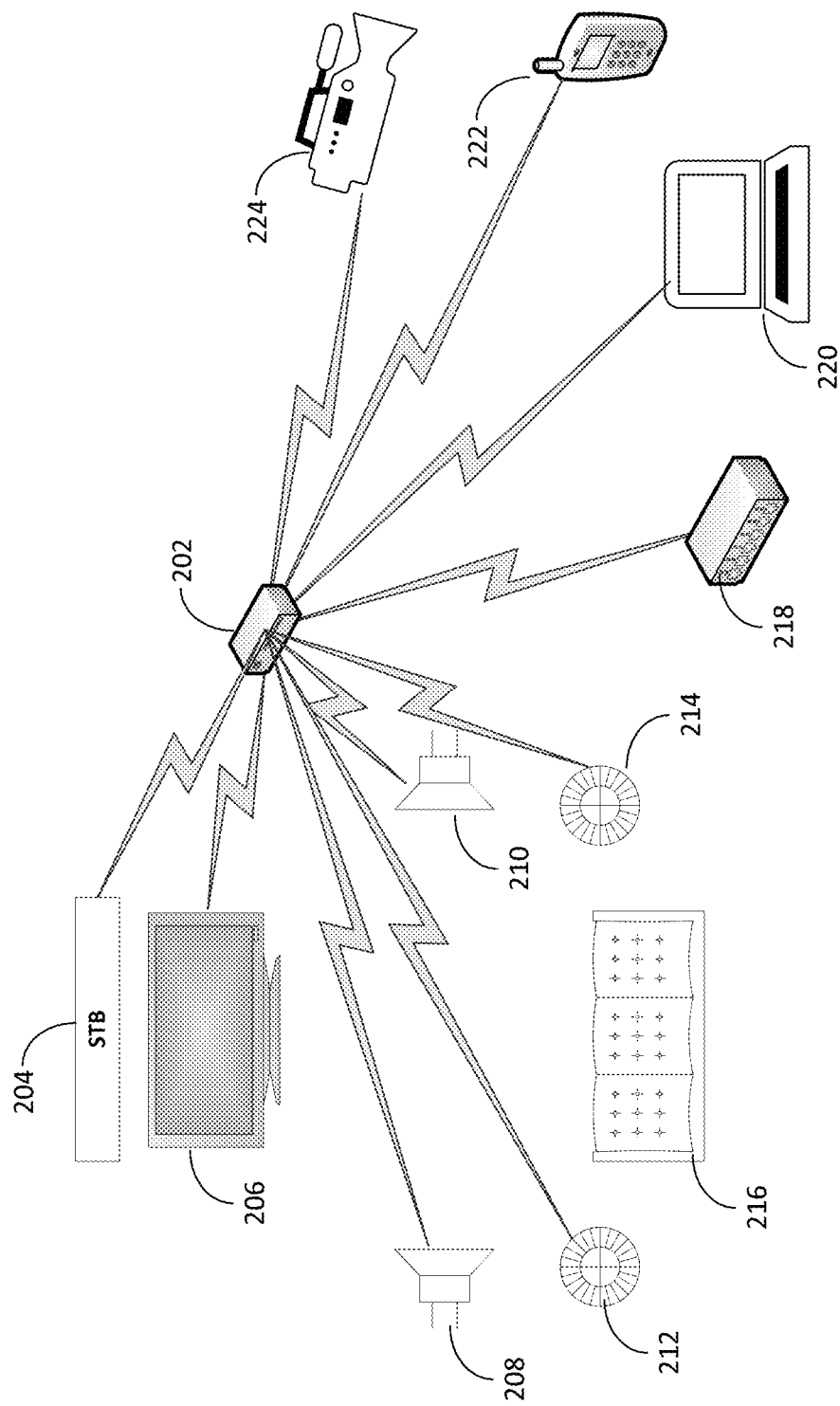

Referring to FIG. 2, in one or more embodiments of a system 200 a customer premises can include a several devices such as a set top box 204, media device (e.g. television) 206, speakers 208, 210, lamps 212, 214, home assistant 218, computer 220, smartphone 222, and video surveillance camera 224. Each of the devices 204-224 can be communicative coupled to a sensor or IoT device (not shown) to exchange data and control information to a service multiplexer 202 or to one or more network services nodes via the service multiplexer 202. Further, the customer premises may arrange the set top box 204, media device 206, speakers 208, 210 and lamps 212, 214 around a living area that includes a couch 216. A user of the customer premises 200 may configure the devices 204-224 into one or more service portfolios and/or tailored applications using dynamic grouping and/or user configurable definable modules. The service multiplexer 202 can exchange communication among devices configured in such service portfolios, devices implementing tailored applications, among themselves and/or network services nodes.

Figure 3:
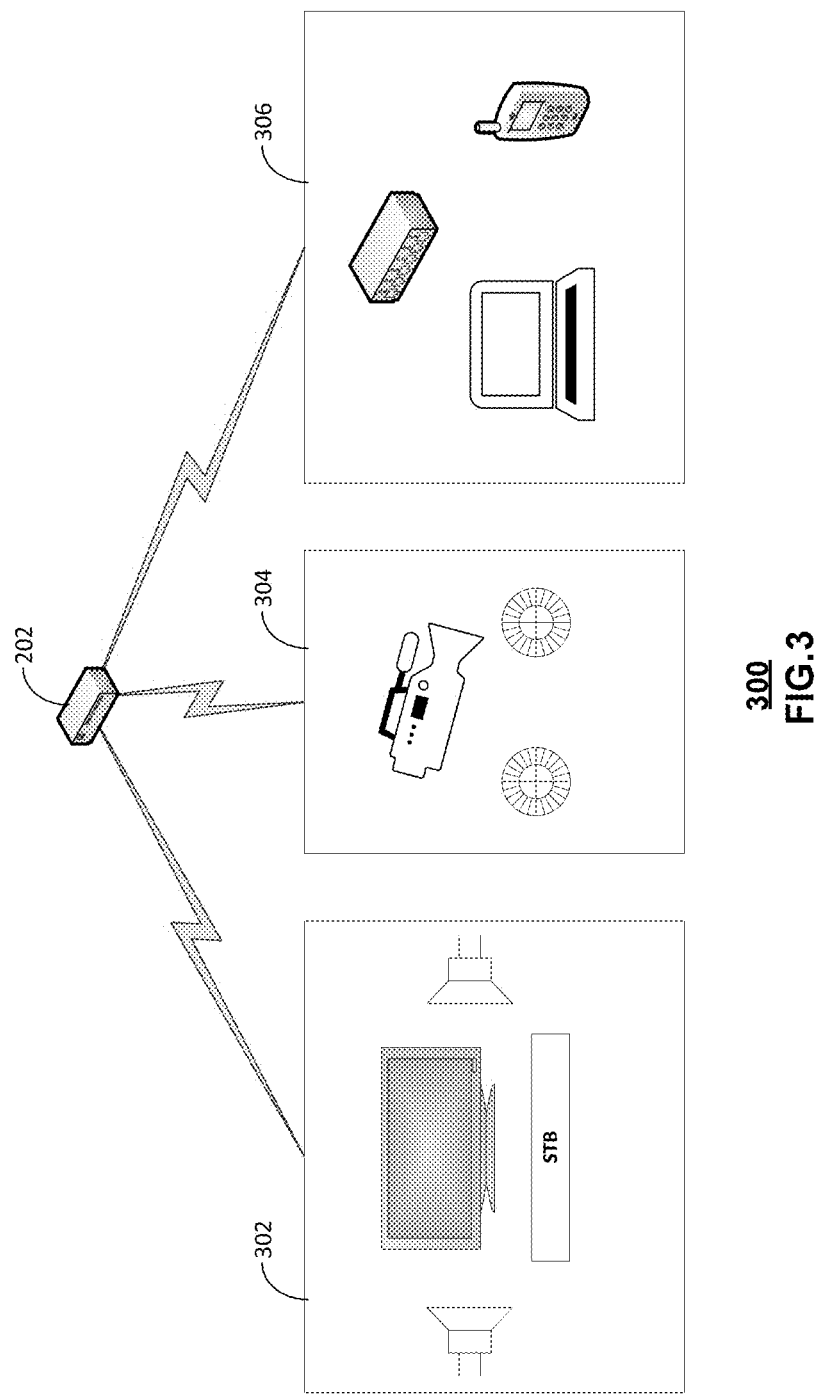

Referring to FIG. 3, in one or more embodiments of system 300, a customer premises can include devices 204-224 communicatively coupled to the service multiplexer 202. Each of the devices 204-224 can be communicative coupled to a sensor or IoT device (not shown) to exchange data and control information to a service multiplexer 202 or to one or more network services nodes via the service multiplexer 202. A user associated with the customer premises can dynamically group some of the devices into different service portfolios. For example, the user can configure the media device, speakers, and set top box into a media service portfolio 302. In another example, the user can configure the video surveillance camera and lamps in a premises security service portfolio 304. In a further example, the user can configure a home assistant, computer, and smartphone into a control service portfolio 306. The service multiplexer 202 can be communicatively coupled to the devices in each of the service portfolios 302, 304, 306 over a premises communication network (i.e. sensor/IoT device communication network). The service portfolios 302, 304, 306 can be created by the user or a smart home system as default or conventional service portfolios.

In one or more embodiments, the user can interact and the services of devices in the media service portfolio in different ways. Further, the user can create a tailored application using devices from the media service portfolio as well as devices from other service portfolios. A tailored application implemented by several devices by dynamically grouping the devices for implementing the tailored application or creating user configurable definable modules comprising the devices that implement the tailored application. For example, a user can create a tailored application for selecting, presenting, and recording media content by dynamically grouping or creating user configurable definable modules comprising devices such as the media device, set top box, and smartphone. The user can select media content from provided by a media server to be presented on the media device. Further, the user can select media content using the smartphone to be delivered by the media server to be recorded by a digital video recorder communicatively coupled to the set top box. In such an example, the service multiplexer 202 can receive instructions for selecting the media content from the smartphone and provide the instructions to the media server. Further, the service multiplexer can receive the media content from the media server and provide the media content to the media device for presentation or the set top box for recording.

In one or more embodiments, the user can create a tailored application to view captured video from the video surveillance camera on the computer. In some embodiments the user may be using the computer at the customer premises and in other embodiments the user may be using the computer at a location remote to the customer premises. In further embodiments, the video surveillance camera captures video of the customer premises environment and provides the captured video content to a premises security server for storage. The user can provide instructions from the computer to the service multiplexer 202. Further, the service multiplexer 202 can deliver the instructions to the premises security server. In response, the premises security server can retrieve the captured video content from storage and provide the captured video content to the service multiplexer 202. Further, the service multiplexer 202 delivers the captured video content to the computer for viewing by the user.

Each of the devices can be communicative coupled to a sensor or IoT device (not shown) to exchange data and control information to a service multiplexer 202 or to one or more network services nodes via the service multiplexer 202.

Figure 4:
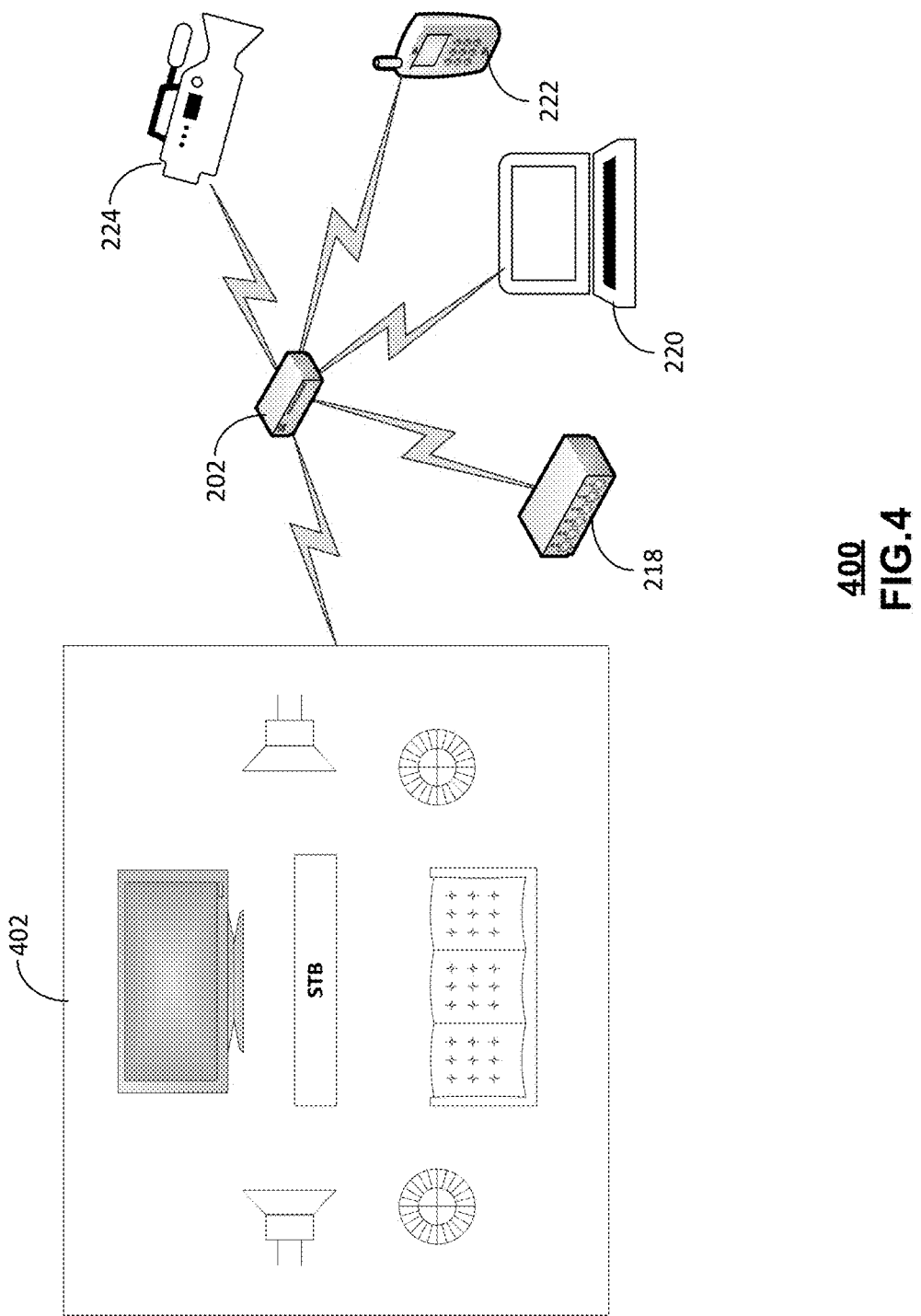

Referring to FIG. 4, in one or more embodiments, a user can create a customer service portfolios or a tailored application from default or conventional service portfolios. For example, the user can configure a custom home theater service portfolio or home theater tailored application 402 that includes a media device, set top box, speakers, and lamps. In some embodiments, the home theater service portfolio or home theater tailored application 402 can include a home assistant 218 as a control device. The home theater service portfolio or home theater tailored application 402 can be created using dynamic grouping of the devices or creating user configurable definable modules that include the devices.

In one or more embodiments, the user can use the voice activation/recognition capability of the home assistant 218 to select media content from a media server to be presented on the media device. The home assistant 218 can provide instructions to the service multiplexer 202 which can be delivered to the media server. In response, the media server provides the requested media content to the service multiplexer 202. Further, the service multiplexer can deliver the media content to the media device and/or set top box for presentation and/or recording. In some embodiments, the user can use the voice activation/recognition capability of the home assistant 218 to control the volume of the speakers. Instructions on volume control can be provided to the service multiplexer 202. In addition, the service multiplexer 202 can then provide the instruction on volume control to each of the speakers. In other embodiments, the user can use the voice activation/recognition capability of the home assistant 218 to control the illumination level of the lamps. Instructions to control the illumination level of the lamps can be provided to the service multiplexer 202. Instructions to control the illumination level of the lamps can be provided to the service multiplexer 202. Also, the service multiple 202 can deliver the instructions to control illumination to the lamps.

Each of the devices can be communicative coupled to a sensor or IoT device (not shown) to exchange data and control information to a service multiplexer 202 or to one or more network services nodes via the service multiplexer 202.

Figure 5:
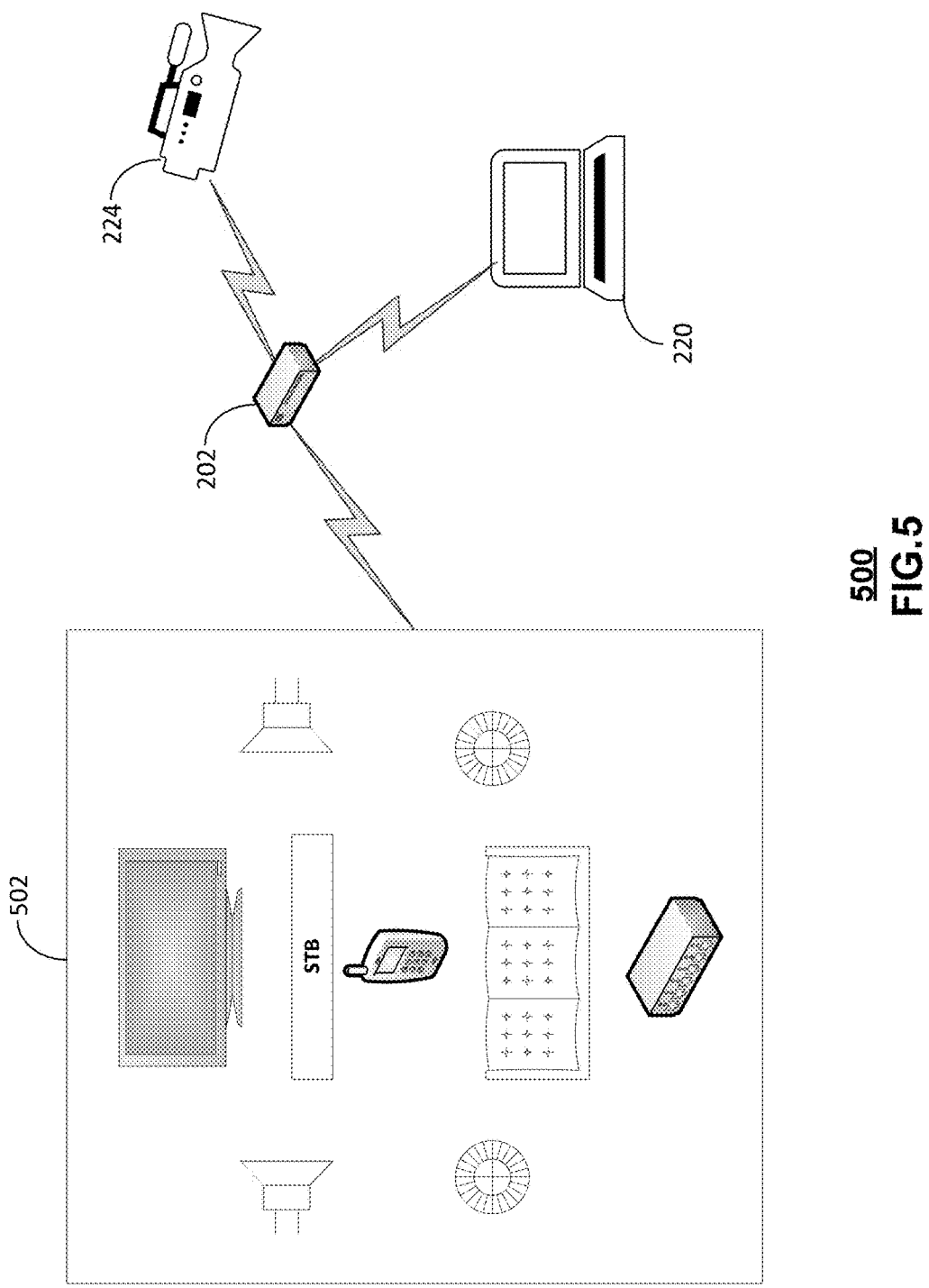

Referring to FIG. 5, the user can further customize a home theater service portfolio or home theater tailored application 502 after using the home theater service portfolio or home theater tailored application 402 to include a smartphone as a control device. The user can use dynamic grouping or user configurable definable modules to add the smartphone to the home theater service portfolio or home theater tailored application. Thus, instead of using a home assistant, the user can control selection/recording of media content as well as control of volume of speakers and illumination level of lamps with the smartphone. Thus, instructions for the selecting the media content are sent to the service multiplexer 202 from the smartphone and provided to a media server. In response, the media server provides the selected media content to the service multiplexer 202. Further, the service multiplexer 202 delivers the selected media content to the media device and/or set top box. Also, the service multiplexer 202 can receive instructions from the smartphone for volume control of the speakers or illumination level of the lamps. In addition, the service multiplexer 202 can deliver instructions for volume control to the lamps and illumination level to the lamps, accordingly.

Each of the devices 204-224 can be communicative coupled to a sensor or IoT device (not shown) to exchange data and control information to a service multiplexer 202 or to one or more network services nodes via the service multiplexer 202.

Figure 6:
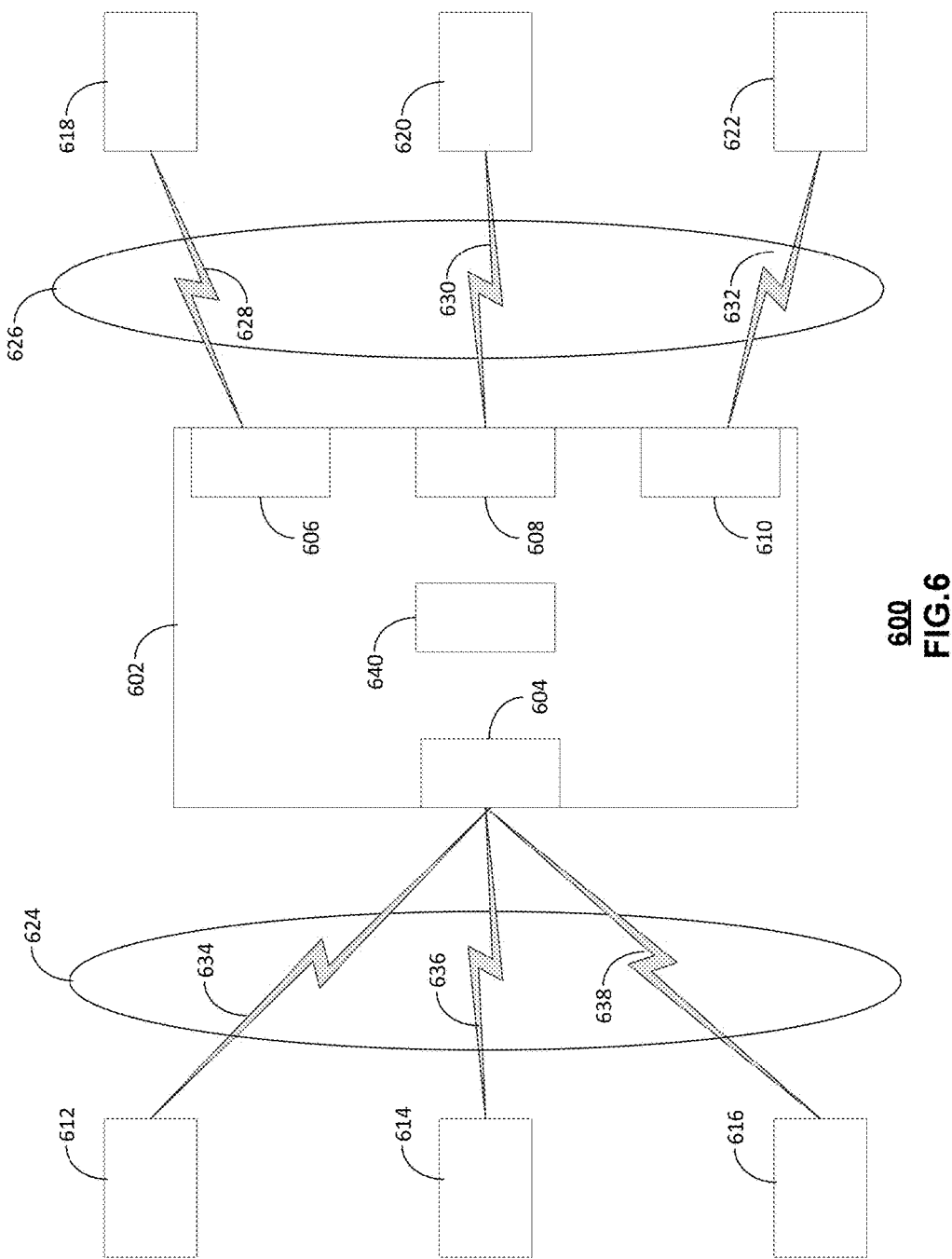

Referring to FIG. 6, one or more embodiments includes a system 600 includes service multiplexer 602 communicatively coupled to network services nodes 618, 620, 622 over a communication network 626. In some embodiments, the communication network 626 is a 5G wireless network that can be a heterogeneous communication network comprising cellular, WiFi, and Bluetooth networks. Further, the 5G communication network includes a control place and user plane. In addition, the service multiplexer 602 includes one or more communication functions 606, 608, 610 that are implemented by software and hardware components such as protocol stacks, processing systems, and memory devices. Further, communication links 628, 630, 632 may carry communication sessions between the service multiplexer 602 and the network services nodes 618, 620, 622 and use communication functions 606, 608, 610. In some embodiments, a communication session over communication links 628, 630, 632 can be an "always-active-session" connected the control place of the 5G communication network 626. Having the "always-active-session" continuously connected to the control plane of the 5G communication network 626 and/or the network services nodes 618, 620, 622 provides for efficient use of network resources. That is, the service multiplexer 602 may be communicating with the network services nodes 618, 620, 622 frequently. Generating a communication session and tearing down a communication session frequently causes the 5G communication network 626 to expend more network resources than having an "always-active-session" continuously connected to the user plane.

In one or more embodiments, the service multiplexer 602 may be coupled to one or more sensor or IoT devices 612, 614, 616 over a premises communication network 624. IoT devices can be communicative coupled to devices within a customer premises to control such devices by a user associated with the customer premises (e.g. media devices, set top boxes, video surveillance cameras, control device, etc.). In some embodiments, the service multiplexer 602 and the premises communication network 624 (i.e. sensor/IoT communication network) may be within the customer premises. In other embodiments, the service multiplexer 602 may be at a location remote to the customer premises and portions of the premises communication network 624 may be within the customer premises and other portion of the premises communication network 624 may be located remote to the customer premises. The premises communication network can be a proprietary communication network, an Internet Protocol (IP) communication network, or a non-IP communication network. Further, the service multiplexer 602 can include a communication function 604 that is implemented by software and hardware components such as protocol stacks, processing systems, and memory devices. Further, communication links 634, 636, 638 may carry communication sessions between the service multiplexer 602 and the IoT devices 612, 614, 616 and use communication functions 604.

In one or more embodiments, the user can configure the service multiplexer 602 using a service management function 640. Further, the service management function 640 is implemented by software and hardware components such as processing systems and memory devices. In addition, a service provider can configure the service management function 640 to initially group the IoT devices 612, 614, 616 (and the devices associated with the IoT devices) into different service portfolios as described herein. Further, a user can configure the service management function 640 to create customer service portfolios and/or tailored applications using dynamic grouping of IoT devices 612, 614, 616 and devices associated with the IoT devices as well as user configurable definable modules that include one or more of the IoT devices 612, 614, 616 and device associated with the IoT devices. Any particular IoT device 612, 614, 616 and device associated with the IoT device can be in more than one service portfolio.

Once a service portfolio or tailored application is created that includes one or more IoT devices 612, 614, 616 (and their associated devices), the service management function 640 can prepare to receive and deliver instructions from control device provide by user input. This can include accessing the protocol stacks needed to communicate with the corresponding network services nodes 618, 620, 622 and IoT devices 612, 614, 616 for the service portfolio or tailored application as well as configuring with the communication functions 604, 606, 608, 610 with the protocol stacks and/or any other logic rules when receiving instructions from a control device for a particular service portfolio or tailored application. Protocol stacks and logic rules can be stored in the service multiplexer 602 or may be accessed from other network nodes accessible by the service multiplexer 602.

For example, the IoT device 616 can be associated with the user's smartphone and IoT device 612 can be associated with the user's media device (e.g. television) as well as IoT device 614 can be associated with the media device speakers. The user can select media content from the smartphone to be presented on the media device. The IoT device 616 sends instructions for retrieving the selected media content to the service multiplexer 602. The communication function 604 receives the instructions. The communication function 604 has been configured a priori by the service management function 640 with logic rules for the service portfolio or tailored application comprising the smartphone, media device, and speakers to relay the instructions to communication function 606, which is communicatively coupled to a network services node 618, which is the media server. The communication function 606 sends the instructions for retrieving the selected media content to the media server. Further, the media server and communication function 606 create a communication session over the user plane of the 5G communication network 626. In addition, the media server sends the selected media content to the service multiplexer 602 via communication session over the user plane. Once the selected media content is received, the communication session between communication function 606 and the media server is torn down. Also, the communication function 606 may store the selected media content on the service multiplexer 602 temporarily. Further, the communication function 604 may access the stored media content and deliver the media content to the media device for presentation. In a further example, the user can control the volume level of the speakers using the smartphone. The smartphone can send the service multiplexer 602 instructions to control the volume of the speakers. The communication function 604 can receive the volume control instructions. The communication function 604 has been configured a priori by the service management function 640 with logic rules for the service portfolio or tailored application comprising the smartphone, media device and speakers to relay the instructions to IoT device 614 to control the volume of the speakers.

Figure 7:
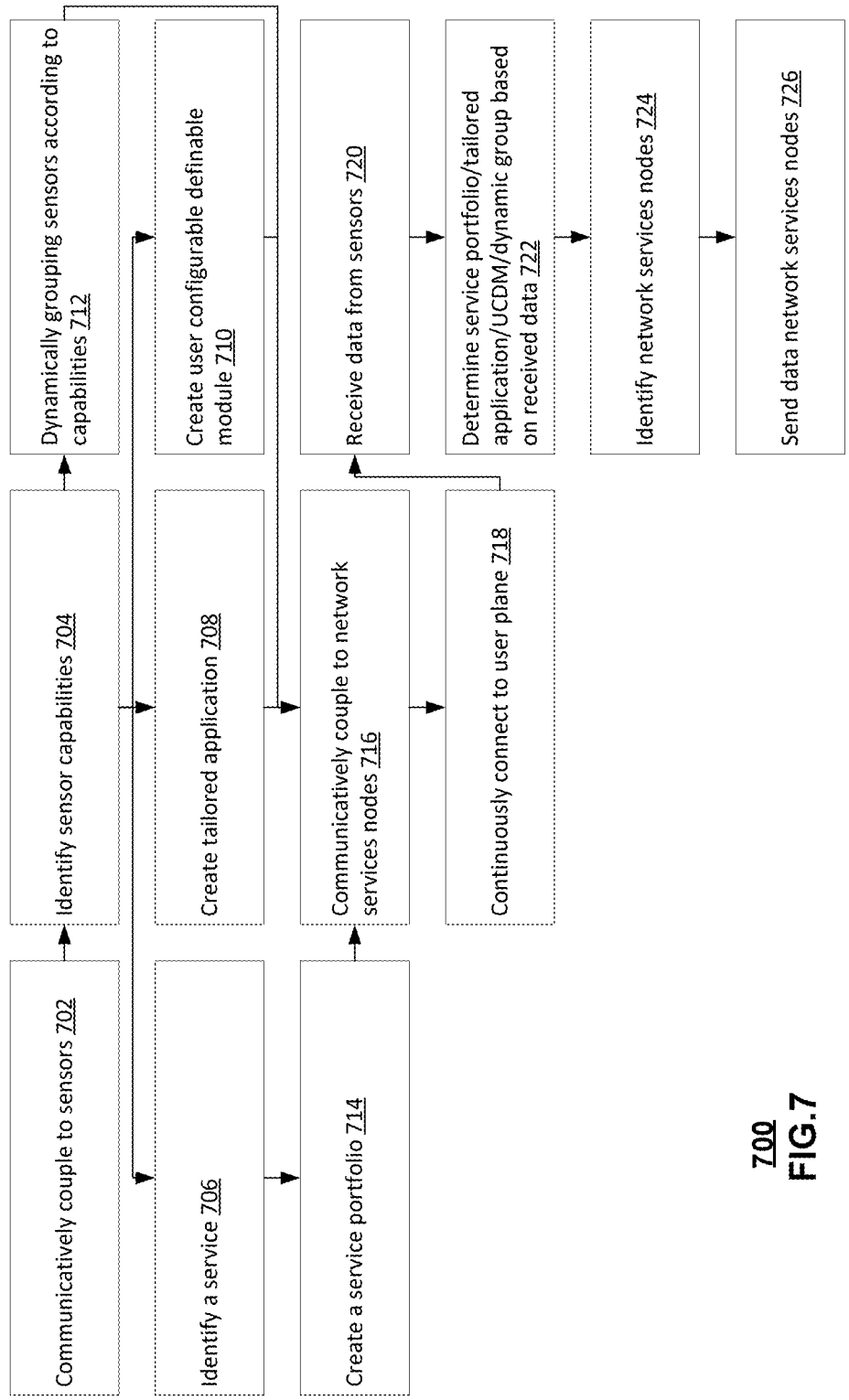
FIG. 7 depicts an illustrative embodiment of a method used in portions of the system described in FIGS. 1-6.

FIG. 7 depicts an illustrative embodiment of a method used in portions of the system described in FIGS. 1-6. The method 700 can be implemented by a service multiplexer described herein. The method 700 can include, at 702, communicatively coupling to multiple sensors or IoT devices over a communication network. The communication network may or may not support an Internet Protocol (IP). Each sensor or IoT device can be associated with a device on a customer premises. Further, the method 700 can include, at 704, identifying capabilities of the multiple sensors or IoT devices. In addition, the method 700 can include, at 706, identifying at least one service associated with a plurality of sensors resulting in a group of services. Each of plurality of sensors is associated with at least one of the group of services. That is, two sensors can support one service and two other sensors can support another service, for example. These two services can be grouped into a service portfolio. The method 700 can include, at 712, creating a service portfolio according to the group of services. Also, the method 700 can include, at 708, comprise creating a tailored application according to the group of services. Further, the method 700 can include, at 710, creating a user configurable definable module according to the group of services. The user configurable definable module can include one or more sensors or IoT devices and their associated devices. In addition, the method 700 can include, at 712, dynamically grouping one or more of the multiple sensors. In some embodiments the user configurable definable modules and or dynamically grouped sensors/IoT devices can be used in a service portfolio or tailored application.

The method 700 can include, at 716, communicatively coupling to multiple network services nodes over a 5th Generation (5G) wireless network according to the service portfolio, tailored application, user configurable definable module, and/or dynamic grouping of sensors/IoT devices. The 5G wireless network includes equipment operating in at least one of a control plane and user plane. Also, the 5G wireless network comprises at least one of a cellular network, WiFi network, and a Bluetooth network. In some embodiments, a portion of the equipment supports connectivity to the control plane and another portion of the equipment supports connectivity to the control plane and user plane. Equipment can include one or more network devices (e.g. control devices, management devices, etc.). In other embodiments, network devices may overlap the two portions of equipment.

Further, the method 700 can include, at 718, continuously connecting to the control plane of the 5G network. Having the service multiplexer continuously connected or having an "always-active" communication session over the control plane to one or more network services nodes is an efficient use of network resources as described herein. In addition, the method 700 can include, at 720, receiving data from the plurality of sensors resulting in received data. Also, the method 700 can include, at 722, determining that the received data is associated with service portfolio, tailored application, user configurable definable module, and/or dynamically created group of sensors/IoT devices. The method 700 can include, at 724, identifying one or more of the network services nodes from the plurality of network services nodes according to the service portfolio, tailored application, user configurable definable module, and/or dynamically created group of sensors/IoT devices. Further, the method 700 can include, at 726, sending the received data to target network services node that can be one of the one or more of the network services nodes over the user plane of the 5G wireless network.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
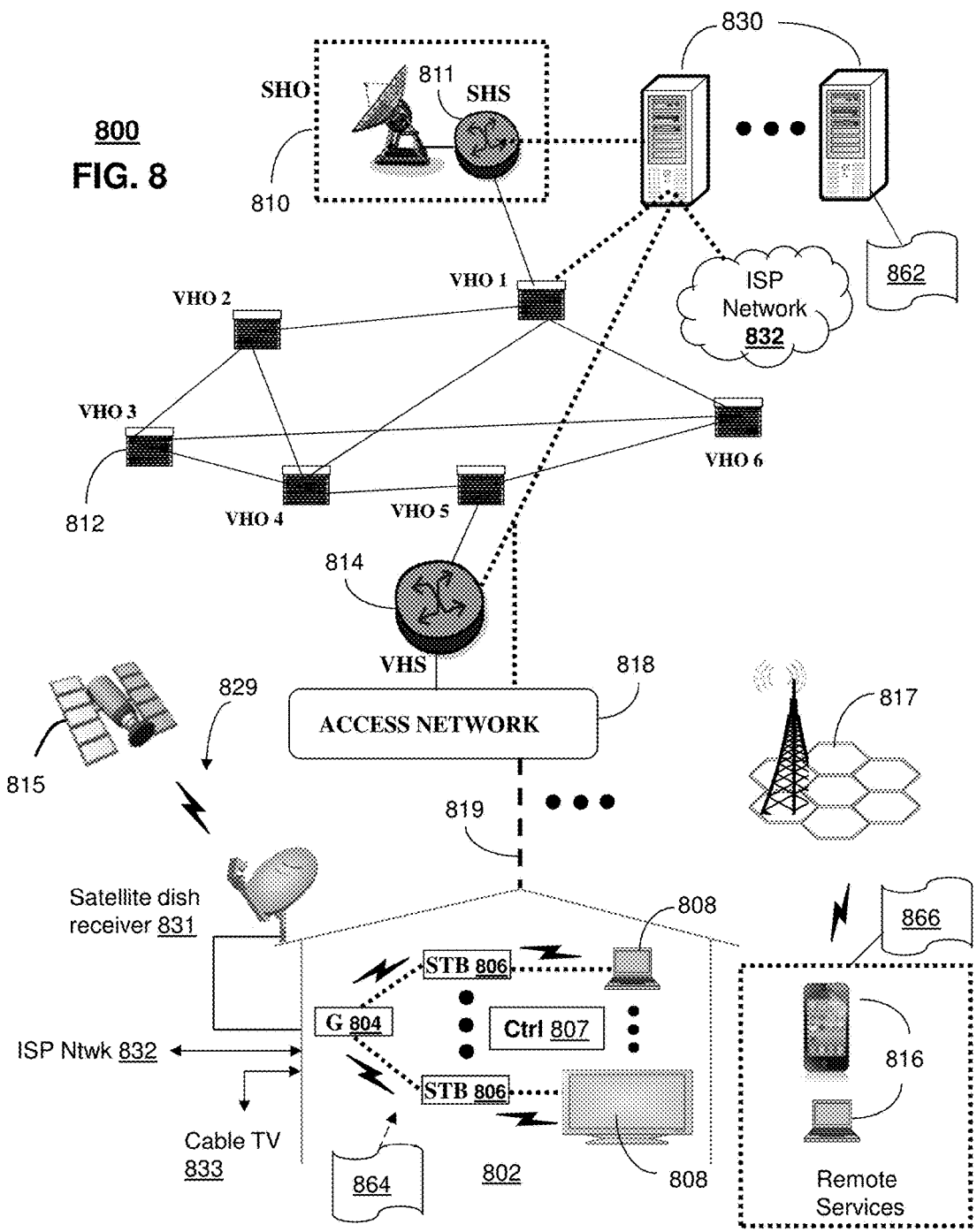
FIGS. 8-9 depict illustrative embodiments of communication systems that provide services by multiplexing service information from sensor data.

FIG. 8 depicts an illustrative embodiment of a communication system 800 for providing various communication services, such as delivering media content. The communication system 800 can represent an interactive media network, such as an interactive television system (e.g., an Internet Protocol Television (IPTV) media system). Communication system 800 can be overlaid or operably coupled with systems 100, 200, 300, 400, 500, 600 of FIGS. 1-6 as another representative embodiment of communication system 800. For instance, one or more devices illustrated in the communication system 800 of FIG. 8 including a service multiplexer identifying a service associated with each of multiple sensors/IoT devices resulting in a group of services, creating a service portfolio/tailored application/user configurable definable module/dynamic group of sensors/IoT device according to the group of services, and communicatively coupling to a plurality of network services nodes over a 5th Generation (5G) wireless network according to the service portfolio. The 5G wireless network includes a control plane and user plane. Further, the service multiplexer can be continuously connecting to the control plane of the 5G wireless network, receiving data from the multiple sensors resulting in received data, determining that the received data is associated with the service portfolio. In addition, the service multiplexer can identify a target network service node(s) from the plurality of network services nodes according to the service portfolio, and send the received data to the target network services node(s) over the user plane of the 5G wireless network.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a service multiplexer (herein referred to as service multiplexer 830). The service multiplexer 830 can use computing and communication technology to perform function 862, which can include among other things, the techniques described by method 700 of FIG. 7. For instance, function 862 of server 830 can be similar to the functions described for service multiplexers 102, 202, 402, 602 of FIGS. 1-6 in accordance with method 700. The media processors 806 and wireless communication devices 816 can be provisioned with software functions 864 and 866, respectively, to utilize the services of service multiplexer 830. For instance, functions 864 and 866 of media processors 806 and wireless communication devices 816 can be similar to the functions described for the communication devices 106, 108, 110, 112, 114, 116, 204-224, 612, 614, and 616 of FIGS. 1-6 in accordance with method 700.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
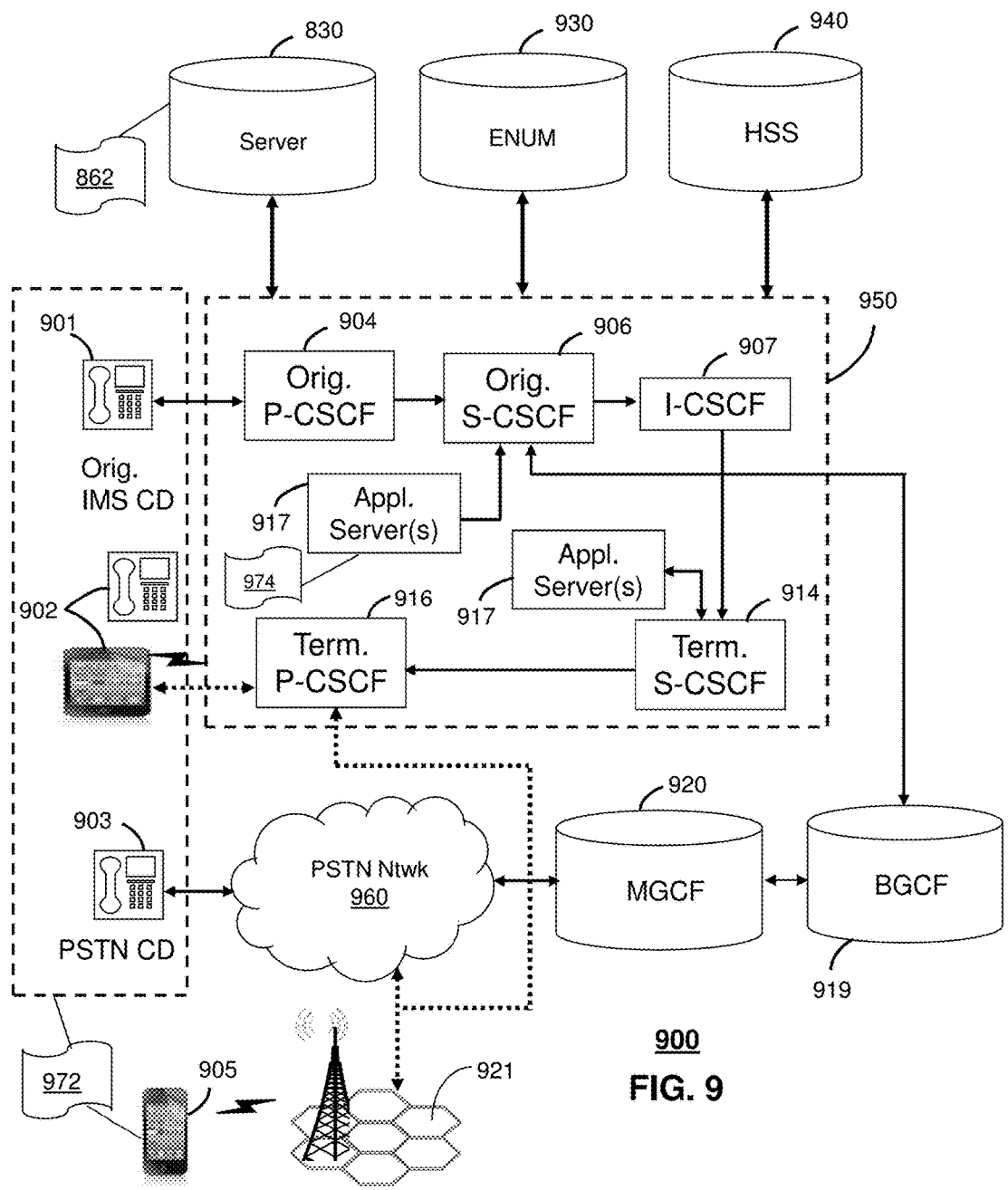

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid or operably coupled with systems 100, 200, 300, 400, 500, and 600 of FIGS. 1-6 and communication system 800 as another representative embodiment of communication system 800. Service multiplexer 830 can identify a service associated with each of a plurality of sensors resulting in a group of services and create a service portfolio according to the group of services. Further, service multiplexer 830 can communicatively couple to a plurality of network services nodes over a 5th Generation (5G) wireless network according to the service portfolio. The 5G wireless network includes a control plane and user plane. In addition, the service multiplexer can continuously connect to the control plane of the 5G wireless network and receive data from the plurality of sensors, and determining that the received data is associated with the service portfolio. Also, the service multiplexer 830 can identify one or more of the network services nodes from the plurality of network services nodes according to the service portfolio, and send the received data to the one or more of the network services nodes over the user plane of the 5G wireless network.

Communication system 900 can comprise a Home Subscriber Server (HSS) 940, a tElephone NUmber Mapping (ENUM) server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The service multiplexer 830 of FIG. 8 can be operably coupled to communication system 900 for purposes similar to those described above. Service multiplexer 830 can perform function 862 and thereby provide service multiplexing services to the CDs 901, 902, 903 and 905 of FIG. 9 similar to the functions described for service multiplexer of FIGS. 1-6 in accordance with method 700 of FIG. 7. CDs 901, 902, 903 and 905, which can be adapted with software to perform function 972 to utilize the services of the service multiplexer 830 similar to the functions described for communication devices 106, 108, 110, 112, 114, 116, 204-224, 612, 614, and 616 of FIGS. 1-6 in accordance with method 700 of FIG. 7. Service multiplexer 830 can be an integral part of the application server(s) 917 performing function 974, which can be substantially similar to function 862 and adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 10:
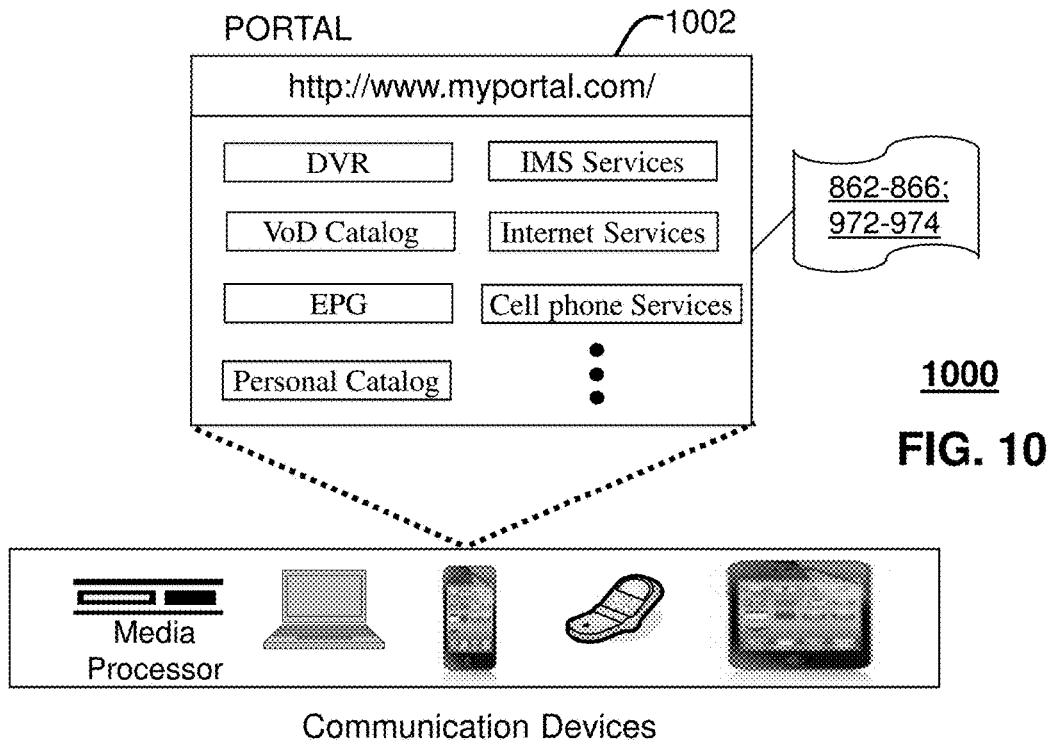
FIG. 10 depicts an illustrative embodiment of a web portal for interacting with the communication systems of systems that provide services by multiplexing service information from sensor data.

FIG. 10 depicts an illustrative embodiment of a web portal 1002 of a communication system 1000. Communication system 1000 can be overlaid or operably coupled with systems 100, 200, 300, 400, 500, and 600 of FIGS. 1-6, communication system 800, and/or communication system 900 as another representative embodiment of systems 100, 200, 300, 400, 500, and 600 of FIGS. 1-6, communication system 400, and/or communication system 900. The web portal 1002 can be used for managing services of systems 100, 200, 300, 400, 500, 600 of FIGS. 1-6 and communication systems 800-900. A web page of the web portal 1002 can be accessed by a Uniform Resource Locator (URL) with an Internet browser using an Internet-capable communication device such as those described in FIGS. 1-6 and FIGS. 8-9. The web portal 1002 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage and provision software applications 862-866, and 972-974 to adapt these applications as may be desired by subscribers and/or service providers of systems 100, 200, 300, 400, 500, and 600 of FIGS. 1-6, and communication systems 800-900. For instance, users of the services provided by server/service multiplexer 830 can log into their on-line accounts and provision the server/service multiplexer 102, 202, 602, and 830 with configuring service portfolios, tailored applications dynamic grouping of sensors/IoT devices, and user configurable definable modules as describes in FIGS. 1-7, and so on. Service providers can log onto an administrator account to provision, monitor and/or maintain the systems 100, 200, 300, 400, 500, and 600 of FIGS. 1-6 or server/service multiplexer 830.

Figure 11:
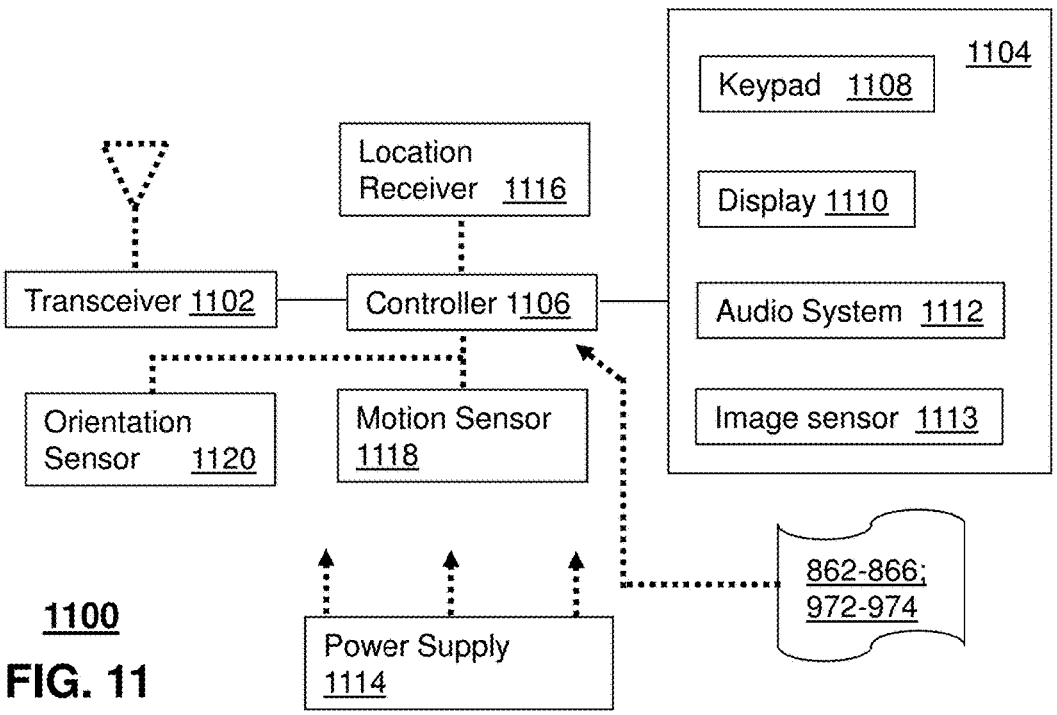
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1-6, and FIGS. 8-9 and can be configured to perform portions of method 700 of FIG. 7.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices of FIGS. 1-6, the media processor 806, the media devices 808, or the portable communication devices 816 of FIG. 8, as well as the IMS CDs 901-902 and PSTN CDs 903-905 of FIG. 9. It will be appreciated that the communication device 1100 can also represent other devices that can operate in systems 100, 200, 300, 400, 500, and 600 of FIGS. 1-6, communication systems 800-900 of FIGS. 8-9 such as a gaming console and a media player. In addition, the controller 1106 can be adapted in various embodiments to perform the functions 862-866 and 972-974, respectively.

Upon reviewing the aforementioned embodiments, it would be evident to an artisan with ordinary skill in the art that said embodiments can be modified, reduced, or enhanced without departing from the scope of the claims described below. For example, a person of ordinary skill in the art would understand that embodiments described or portions thereof can be combined or separated, accordingly. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
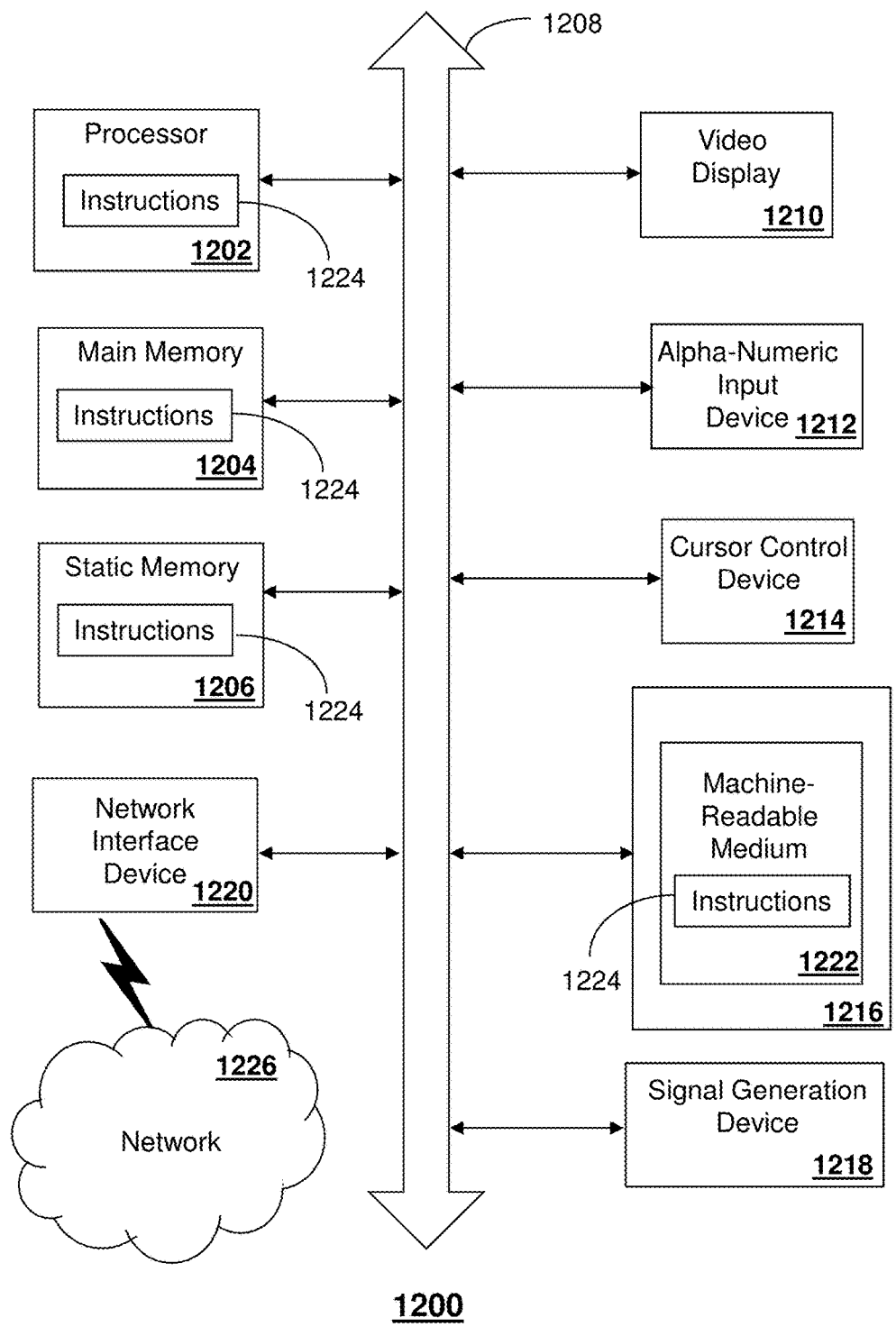
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the service multiplexer 1230, the media processor 806, 106, 108, 110, 112, 114, 116, 204-224, 612, 614, and 616 and other devices of FIGS. 1-6. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
identifying at least one service associated with a plurality of sensors resulting in a group of services, wherein each of plurality of sensors is associated with at least one of the group of services;
creating a service portfolio according to the group of services;
communicatively coupling to a plurality of network services nodes over a wireless network according to the service portfolio, wherein the wireless network includes equipment operating in at least one of a control plane and user plane;
continuously connecting to the control plane of the wireless network;
receiving data from the plurality of sensors resulting in received data;
determining that the received data is associated with the service portfolio;
identifying a target network services node from the plurality of network services nodes according to the service portfolio; and
sending the received data to the target network services node over the user plane of the wireless network.

2. The device of claim 1, wherein the operations further comprise creating a tailored application according to the group of services.

3. The device of claim 1, wherein the operations further comprise identifying capabilities of the plurality of sensors, and wherein creating the service portfolio comprises dynamically grouping one or more of the plurality of sensors.

4. The device of claim 1, wherein the operations further comprise creating a user configurable definable module according to the group of services.

5. The device of claim 1, wherein the operations further comprise communicatively coupling to the plurality of sensors over a communication network, wherein the communication network does not support an Internet Protocol (IP).

6. The device of claim 1, wherein the wireless network supports IP.

7. The device of claim 1, wherein the wireless network comprises at least one of a cellular network, WiFi network, and a Bluetooth network, and wherein a first portion of the equipment supports connectivity to the control plane and a second portion of the equipment supports connectivity to the control plane and user plane.

8. A non-transitory, machine-readable storage medium, comprising executable instructions that, when executed by a processing system including a processor, facilitate performance of operations, comprising:
identifying at least one service associated with a plurality of sensors resulting in a group of services, wherein each of plurality of sensors is associated with at least one of the group of services;
creating a tailored application according to the group of services;
communicatively coupling to a plurality of network services nodes over a wireless network according to the tailored application, wherein the wireless network includes equipment operating in at least one of a control plane and user plane;
continuously connecting to the control plane of the wireless network;
receiving data from the plurality of sensors resulting in received data;
determining that the received data is associated with the tailored application;
identifying a target network services node from the plurality of network services nodes according to the tailored application; and
sending the received data to the target network services node over the user plane of the wireless network.

9. The non-transitory, machine-readable storage medium of claim 8, wherein the operations further comprise creating a service portfolio according to the group of services.

10. The non-transitory, machine-readable storage medium of claim 9, wherein the operations further comprise identifying capabilities of the plurality of sensors, and wherein creating the service portfolio comprises dynamically grouping one or more of the plurality of sensors.

11. The non-transitory, machine-readable storage medium of claim 8, wherein the operations further comprise creating a user configurable definable module according to the group of services.

12. The non-transitory, machine-readable storage medium of claim 8, wherein the operations further comprise communicatively coupling to the plurality of sensors over a communication network, wherein the communication network does not support an Internet Protocol (IP).

13. The non-transitory, machine-readable storage medium of claim 8, wherein the wireless network supports IP.

14. The non-transitory, machine-readable storage medium of claim 8, wherein the wireless network comprises at least one of a cellular network, WiFi network, and a Bluetooth network, and wherein a first portion of the equipment supports connectivity to the control plane and a second portion of the equipment supports connectivity to the control plane and user plane.

15. A method, comprising:
identifying, by a processing system including a processor, at least one service associated with a plurality of sensors resulting in a group of services, wherein each of plurality of sensors is associated with at least one of the group of services;
creating, by the processing system, a user configurable definable module according to the group of services;
communicatively coupling, by the processing system, to a plurality of network services nodes over a wireless network according to the user configurable definable module, wherein the wireless network includes equipment operating in at least one of a control plane and user plane;
continuously connecting, by the processing system, to the control plane of the wireless network;
receiving, by the processing system, data from the plurality of sensors resulting in received data;
determining, by the processing system, that the received data is associated with the user configurable definable module;
identifying, by the processing system, a target network services node from the plurality of network services nodes according to the user configurable definable module; and
sending, by the processing system, the received data to the target network services node over the user plane of the wireless network.

16. The method of claim 15, further comprising creating, by the processing system, a service portfolio according to the group of services.

17. The method of claim 16, further comprising identifying, by the processing system, capabilities of the plurality of sensors, and wherein creating the service portfolio comprises dynamically grouping, by the processing system, one or more of the plurality of sensors.

18. The method of claim 15, further comprising creating, by the processing system, a tailored application according to the group of services.

19. The method of claim 15, further comprising communicatively coupling, by the processing system, to the plurality of sensors over a communication network, wherein the communication network does not support an Internet Protocol (IP).

20. The method of claim 15, wherein the wireless network supports IP, and wherein the wireless network comprises at least one of a cellular network, WiFi network, and a Bluetooth network, and wherein a first portion of the equipment supports connectivity to the control plane and a second portion of the equipment supports connectivity to the control plane and user plane.

\* \* \* \* \*